United States Patent [19]

Warning, Jr.

[11] Patent Number: 4,582,231

[45] Date of Patent: Apr. 15, 1986

[54] CONTACT TYPE LIQUID APPLICATOR

[75] Inventor: Walter B. Warning, Jr., Shaumburg, Ill.

[73] Assignee: Airprint Systems, Inc., Itasca, Ill.

[21] Appl. No.: 122,016

[22] Filed: Feb. 19, 1980

[51] Int. Cl.[4] .............................................. G01F 11/00

[52] U.S. Cl. .................................... 222/485; 222/487; 222/506; 222/509; 222/518

[58] Field of Search ............... 222/485, 484, 487, 506, 222/509, 518, 149; 137/867, 868; 251/253; 118/255

[56] References Cited

U.S. PATENT DOCUMENTS

| | | | |
|---|---|---|---|
| 502,969 | 8/1893 | Jackson | 222/506 X |
| 708,714 | 9/1902 | Jackson | 137/868 X |
| 2,574,534 | 11/1951 | Curto | 222/506 X |
| 3,239,106 | 3/1966 | Sipusic | 222/487 X |
| 3,361,301 | 1/1968 | Meshberg | 222/149 |
| 3,584,789 | 6/1971 | Traynor | 222/149 |
| 3,811,604 | 5/1974 | Perry | 222/485 X |
| 3,840,158 | 10/1974 | Baker et al. | 222/487 |
| 3,991,917 | 11/1976 | Moen | 222/506 X |

FOREIGN PATENT DOCUMENTS

| | | | |
|---|---|---|---|
| 807946 | 1/1959 | United Kingdom | 222/509 |

*Primary Examiner*—Charles A. Marmor
*Attorney, Agent, or Firm*—Edmond T. Patnaude

[57] ABSTRACT

A contact applicator head includes a plurality of needle valves which are each spring biased against a respective one of a plurality of valve seats, and a rotary cam actuator which when rotated retracts the needle valves away from the seats.

2 Claims, 5 Drawing Figures

CONTACT TYPE LIQUID APPLICATOR

The present invention relates in general to a new and improved device for controlling the application of a liquid adhesive or the like to a member which is moving past the device, and it relates more particularly to a novel self-contained extrusion head which may be used to apply a plurality of glue patterns to rapidly moving webs or package materials.

BACKGROUND OF THE INVENTION

In the packaging field, the application of liquid adhesives to packaging materials is sometimes carried out by extruding the adhesives onto the packaging materials through orifices in a contact extrusion head. Such heads are commonly connected to a reservoir of the liquid under pressure, and a control valve is connected between the reservoir and the head. A problem with that type of system has been the tendency of the adhesive to set up in the orifices when the control valve is closed to interrupt liquid flow through the head. One attempt to alleviate that problem utilized self closing nipple-like check valve members at each orifice. These valves were intended to automatically seal the interior of the head from the ambient when liquid flow through the head terminated. Such attempts have not been entirely successful inasmuch as they do not completely eliminate the dripping or plugging of the orifices after liquid flow to the head is terminated. Consequently, the extrusion heads which are now in use require frequent cleaning and unplugging of the orifices. More importantly, however, unless closely watched during use, one or more of the orifices become plugged so that an improper pattern is placed on the material to be glued. When such plugging is discovered it is necessary to shut down the line to clean or replace the plugged head unless backup heads are provided.

SUMMARY OF THE INVENTION

Briefly, there is provided in accordance with the teachings of the present invention a liquid applicator head including a plurality of needle valves which are spring biased into the respective extrusion orifices. In a preferred embodiment of the invention a rotary actuator is mounted to the head and operates a rotary cam to retract the needles from the discharge orifices. A separate spring for each valve provides a positive closing force to close each associated needle valve whereby subsequent dripping or oozing of the liquid from the orifice is eliminated. The moving parts within the head are in communication with the liquid supply at all times so as to be lubricated by the liquid. The head can, moreover, be completely disassembled for cleaning with a solvent where necessary.

GENERAL DESCRIPTION OF THE DRAWINGS

The present invention will be better understood by a reading of the following detailed description taken in connection with the accompanying drawings wherein.

DETAILED DESCRIPTION OF THE INVENTION

Figure 1:
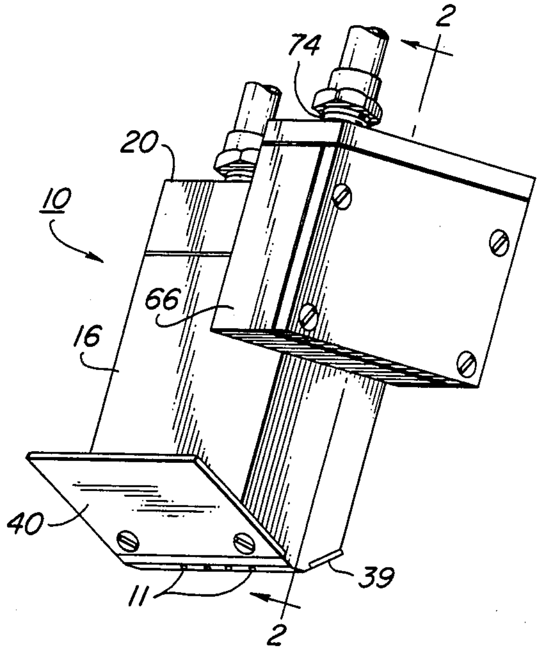
FIG. 1 is a perspective view of a contact liquid applicator head embodying the present invention.

Referring now to the drawings, there is shown a self-contained liquid applicator head 10 of the contact type having a plurality of orifices 11 through which a liquid is discharged in the form of a plurality of beads 14 (FIG. 4) onto a member 12 which moves past the head in contact therewith.

Figure 2:
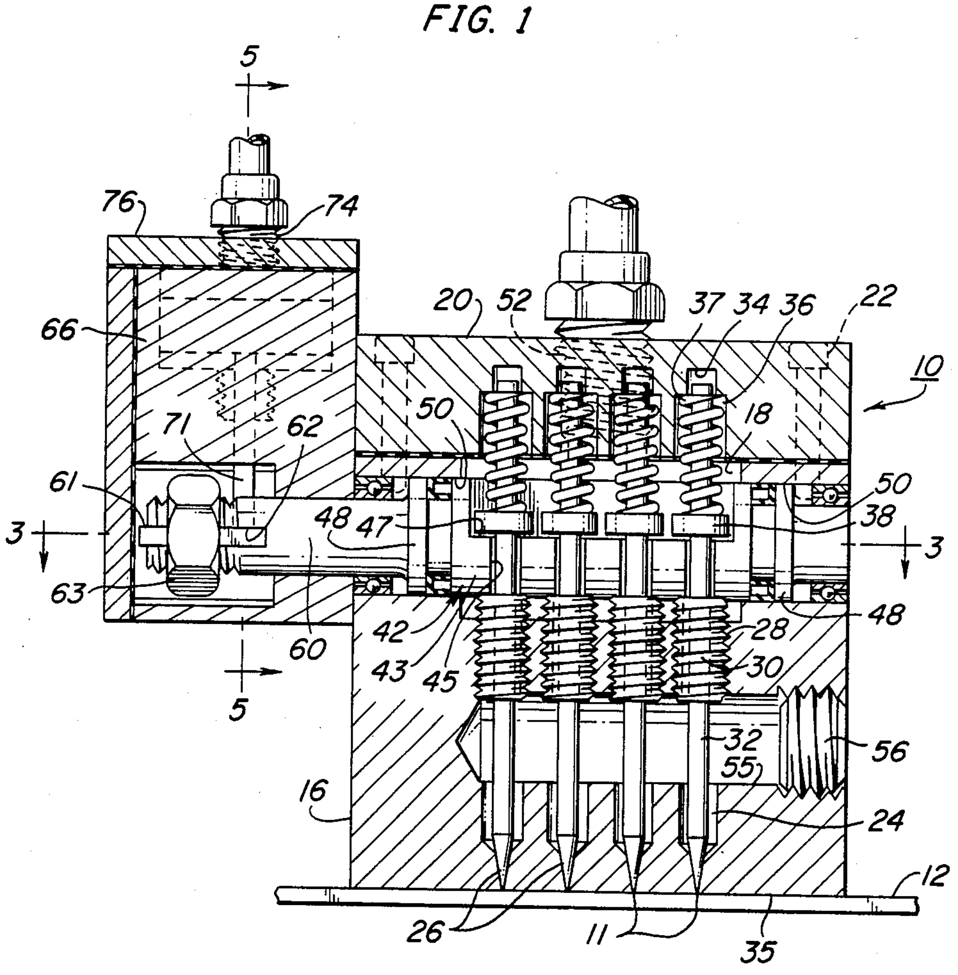
FIG. 2 is a cross-sectional view taken along the line 2—2 in FIG. 1, and showing an associated web onto which a plurality of liquid deposits are to be made.
Figure 4:
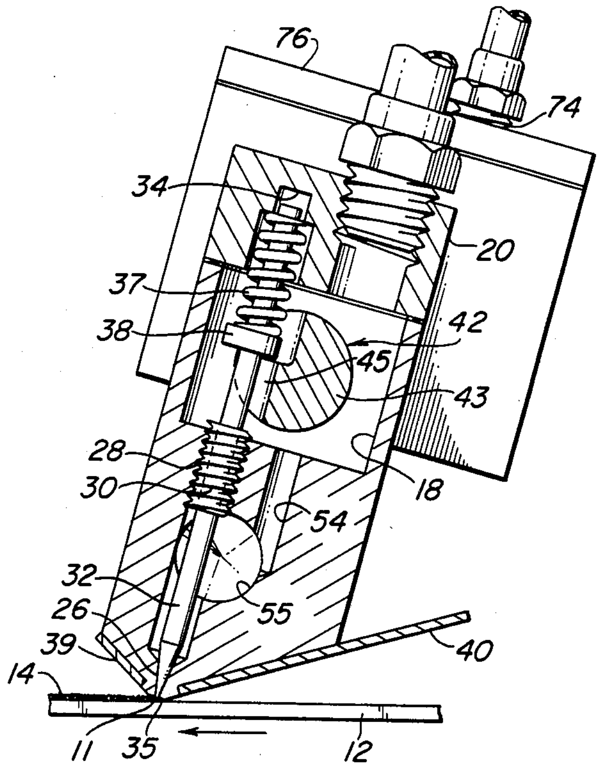
FIG. 4 is a cross-sectional view taken along the line 4—4 in FIG. 2; and showing the head in use

The head 10 includes a body member 16 having an upper cavity 18 opening at the top and a cover member 20 attached to the body over the cavity 16 by a plurality of machine screws 22. A plurality of parallel holes 24 are provided in the body member 16 and extend from the cavity 18 to the discharge orifices 11. The lower end portions of the holes 24 are as best shown in FIGS. 2 and 4 convergent thereby to provide frusto-conical valve seats 26 terminating in circular discharge openings 11 of the desired diameter. The holes 24 are provided at the top with internal threads 28 in which sleeve bushings 30 are mounted. A plurality of needle valve elements 32 having frusto-conical forward portions shaped complimentary to the valve seats slidably extend through the bushings 30 with their rear ends extending into respective ones of a plurality of blind holes 34 in the cover 20. The forward ends of the needles 32 terminate at the very ends of the seats 26 when the valves are closed so that when the valves are closed there are no recesses in which any adhesive can be retained. Preferably the forward ends of the needs are flat and coplanar with the flat contact surface 35 of the body 16.

As shown, the holes 34 are provided with counterbores 36 which respectively receive one of a plurality of coil springs 37. The springs 37 are compressed between collers 38 provided on the needle valve elements 32 and annular shoulders at the bases of the counterbores 36. The springs 37 thus bias the valves 32 individually into closed, sealing positions against the valve seats 26. A pair of wear plates 39 and 40 are mounted to the bottom faces of the body member 16.

In order to control the opening and closing of the needle valves, a cam actuator member 42 is rotatably mounted in the body member 16. The member 42 is generally cylindrical having a central section 42 which is hemispherical in cross-section and provided with a plurality of slots 45 through which the valve elements 32 extend. The central section 43 has a planar surface 47 onto which the slots 45 open and against which the collars 38 are pressed by the springs 37. The cam actuator member 42 has cylindrical bearing surfaces 48 on both sides of the central section 43, and these bearing surfaces are journaled in cylindrical openings 49 and 50 in the body member 16. Suitable seals are mounted in annular grooves in the bearing surface 48.

Figure 3:
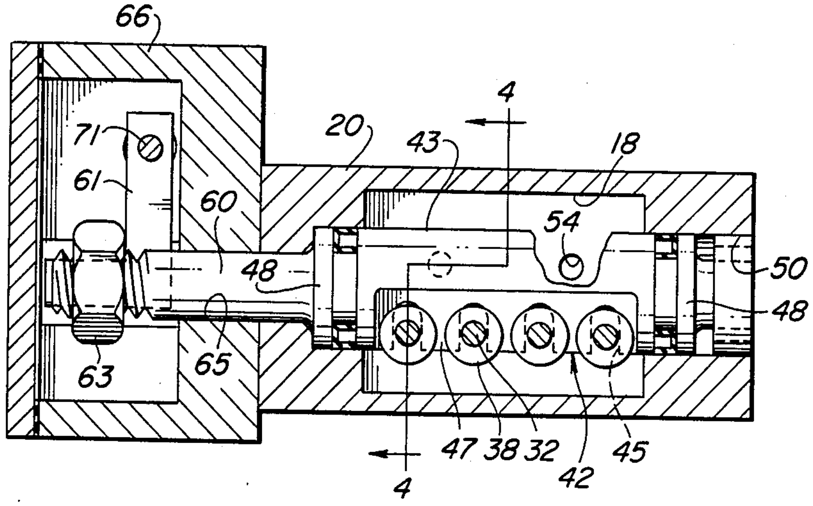
FIG. 3 is a cross-sectional view taken along the line 3—3 in FIG. 2.

A liquid inlet part 52 extends through the cover 20 and supplies liquid to the cavity 18. A plurality of holes 54, best shown in FIGS. 3 and 4 connect the upper part of the cavity 18 to a transverse bore 55 which opens onto the holes 24 below the bushings 30 to provide a lower cavity connected to the upper cavity by the passageways 54. A plug 56 seals the cavity in the head from the ambient. Wherefore the cavity 18 is filled with liquid at all times and is sealed from the ambient when the needle valves are closed, and the bushings are lubricated by the liquid in the cavity.

A shaft portion 60 which is integral with the actuator 42 extends from the housing and is rotated in order to open and close the valves. An actuating arm 61 is filled in a diametric slot 62 in the distal end of the shaft portion 60 and held in place by means of a nut 63. The shaft portion 60 extends through a bore 65 in an actuator housing 66 having a cover 67 suitably attached thereto by a plurality of machine screws.

Figure 5:
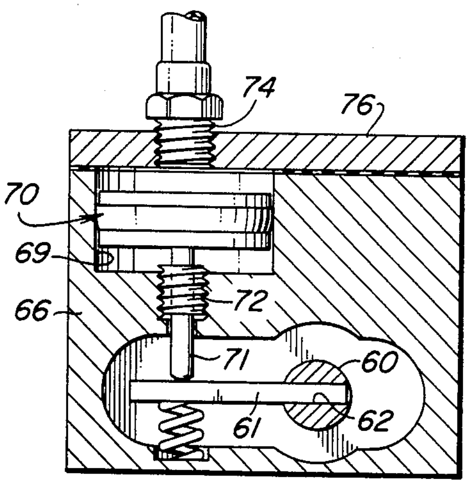
FIG. 5 is a cross-sectional view taken along the line 505 in FIG. 2.

As best shown in FIG. 5, a cylindrical cavity 69 is provided in the body of the housing 66 and a piston 70 is mounted for sliding movement in the cavity 69. An actuating rod 71 on the piston slidably extends through a sleeve bushing 72 into engagement with the actuating arm 61. An air inlet fitting 74 extends through a cover plate 76 which is sealably secured to the housing body 66 over the cylinder cavity 69. When air is supplied under pressure to the line connected to the fitting 74 the arm is pivoted counterclockwise as shown in FIG. 5 to rotate the cam actuator clockwise as shown in FIG. 4 to lift the needle valve elements 32 out of the seats 26 and thereby open the valves. When the pressure to the fitting is relieved, the springs 37 return the needle valve elements 32 to the seated positions and return the piston 70 to the upper positions as shown in FIG. 5. For some applications it is necessary to provide additional force to return the piston to its initial positions. For this purpose a spring may be mounted in the housing body 66 or an additional pneumatic line opening onto the lower end of the piston may be used.

The pneumatic actuator may be replaced with any other mechanism which is suitable for rotating the cam actuator 42. For example, a rotary solenoid may be used for this purpose.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. Liquid applicator apparatus comprising:

a body having a plurality of parallel bores therein opening onto one face of said body to provide a plurality of orifices, said bores each having a frusto-conical valve seat surface immediately adjacent the face of said body defining the associated one of said orifices, a plurality of needle valve elements mounted for axial movement in said bores and each having a frusto-conical valve surface complimentary to the associated one of said valve seat surfaces, the distal ends of said needle valve elements being substantially flush with said one face of said body when said valve elements are in sealing engagement with said seat surfaces, passageway means opening onto said bores rearwardly of said valve seat surfaces for carrying liquid to said bores, spring means mounted in said body for biasing each of said needle valves toward the associated one of said orifices to press said valve surfaces against said valve seat surfaces, valve actuator means connected to all of said needle valves for simultaneously retracting said valve surfaces away from said valve seat surfaces, means defining a first cavity in said body, said spring means being disposed in said first cavity, means defining a second cavity in said body, said valve seat surfaces opening into said second cavity, a plurality of guide bushings mounted in said body between said first and second cavities, said needle valve elements slidably extending through said guide bushings, said passageway means being interconnected between said first and second cavities, and a liquid inlet opening into one of said cavities.

2. Liquid applicator apparatus according to claim 1 wherein:

said guide bushings and said valve seats provide the sole lateral guides for said needle valve elements.

* * * * *